United States Patent
Ortmann et al.

(10) Patent No.: US 12,507,925 B2
(45) Date of Patent: Dec. 30, 2025

(54) SAMPLING WITH FITTING BETWEEN NEEDLE AND HOUSING

(71) Applicant: Agilent Technologies, Inc., Santa Clara, CA (US)

(72) Inventors: Thomas Ortmann, Straubenhardt/Ottenhausen (DE); Michael Lang, Baden-Wuttemberg (DE)

(73) Assignee: Agilent Technologies, Inc., Santa Clara, CA (US)

( * ) Notice: Subject to any disclaimer, the term of this patent is extended or adjusted under 35 U.S.C. 154(b) by 495 days.

(21) Appl. No.: 18/011,127

(22) PCT Filed: Jun. 22, 2021

(86) PCT No.: PCT/IB2021/055482
§ 371 (c)(1),
(2) Date: Dec. 16, 2022

(87) PCT Pub. No.: WO2022/003482
PCT Pub. Date: Jan. 6, 2022

(65) Prior Publication Data
US 2023/0210420 A1  Jul. 6, 2023

(30) Foreign Application Priority Data
Jun. 30, 2020 (DE) .................. 10 2020 117 218.4

(51) Int. Cl.
*A61B 5/15* (2006.01)
*A61B 5/145* (2006.01)

(52) U.S. Cl.
CPC . *A61B 5/15* (2013.01); *A61B 5/14* (2013.01)

(58) Field of Classification Search
CPC .. G01N 30/18; G01N 2030/185; G01N 30/24; G01N 30/20; G01N 2035/0434;
(Continued)

(56) References Cited

U.S. PATENT DOCUMENTS

| | | |
|---|---|---|
| 4,982,597 A | 1/1991 | Berger |
| 6,175,409 B1 | 1/2001 | Nielsen et al. |

(Continued)

FOREIGN PATENT DOCUMENTS

| | | |
|---|---|---|
| CN | 106770848 B | 10/2018 |
| DE | 102014109538 A1 | 1/2016 |

(Continued)

OTHER PUBLICATIONS

PCT Notification of Transmittal of the International Search Report & Written Opinion mailed on Sep. 24, 2021 for Application No. PCT/IB2021/055482; 15 Pages.

*Primary Examiner* — John E Breene
*Assistant Examiner* — Truong D Phan

(57) ABSTRACT

A sampling unit includes a needle for aspirating a sample fluid, a housing, and a fitting. The needle includes a needle tip and a needle channel through the needle for guiding the aspirated sample fluid. The needle channel opens at the needle tip. The housing includes a housing cavity and a housing channel opening into the housing cavity. The fitting includes a fitting cavity and a fitting channel. The fitting is configured for sealingly receiving the needle tip into the fitting cavity and for being inserted into the housing cavity, so that the fitting channel on one side fluidically couples to the needle channel and on another side couples to the housing channel.

18 Claims, 4 Drawing Sheets

(58) Field of Classification Search
CPC ......... G01N 2001/247; G01N 35/1079; G01N 35/10; G01N 30/22; G01N 2030/027; G01N 30/16; G01N 30/17; G01N 30/19; G01N 30/21; G01N 30/23; B01D 15/14; A61B 5/150572; A61B 5/150389; A61B 5/150374; A61B 5/6848; A61B 5/150351; A61B 5/150503; A61M 5/20; F16L 31/00; F16L 37/02–20
USPC .................................. 73/49.8, 864.86, 61.56
See application file for complete search history.

(56) References Cited

U.S. PATENT DOCUMENTS

| | | | |
|---|---|---|---|
| 7,195,229 | B2 | 3/2007 | Maeda |
| 9,513,265 | B2 | 12/2016 | Kheim |
| 2003/0143123 | A1 | 7/2003 | Maeda |
| 2006/0213258 | A1 | 9/2006 | Hale et al. |
| 2011/0167898 | A1 | 7/2011 | Zhou et al. |
| 2012/0164026 | A1* | 6/2012 | Dehmer .................. B01L 3/021 422/68.1 |
| 2014/0150923 | A1* | 6/2014 | Stalder ................... G01N 30/18 141/1 |
| 2016/0003383 | A1 | 1/2016 | Zeko et al. |
| 2016/0334031 | A1 | 11/2016 | Shoykhet et al. |
| 2017/0343520 | A1 | 11/2017 | Ortmann et al. |

FOREIGN PATENT DOCUMENTS

| | | |
|---|---|---|
| DE | 102014109538 B4 | 8/2018 |
| DE | 102016121519 B4 | 7/2019 |
| EP | 0423517 B1 | 12/1993 |
| EP | 1577012 A1 | 9/2005 |
| GB | 2486678 A | 6/2012 |
| WO | 2012073713 A1 | 6/2012 |
| WO | 2020084334 A1 | 4/2020 |
| WO | 2020121430 A1 | 6/2020 |

* cited by examiner

SAMPLING WITH FITTING BETWEEN NEEDLE AND HOUSING

RELATED APPLICATIONS

This application is the national stage under 35 U.S.C. 371 of International Application No. PCT/IB2021/055482, filed Jun. 22, 2021; which claims priority to German Application No. DE 10 2020 117 218.4, filed Jun. 30, 2020; the entire contents of each of which are incorporated by reference herein.

TECHNICAL FIELD

The present invention relates to sample injection in particular for chromatographic sample separation.

BACKGROUND

For liquid separation in a chromatography system, a mobile phase comprising a sample fluid (e.g. a chemical or biological mixture) with compounds to be separated is driven through a stationary phase (such as a chromatographic column packing), thus separating different compounds of the sample fluid which may then be identified. The term compound, as used herein, shall cover compounds which might comprise one or more different components.

The mobile phase, for example a solvent, is pumped under high-pressure typically through a chromatographic column containing packing medium (also referred to as packing material or stationary phase). As the sample is carried through the column by the liquid flow, the different compounds, each one having a different affinity to the packing medium, move through the column at different speeds. Those compounds having greater affinity for the stationary phase move more slowly through the column than those having less affinity, and this speed differential results in the compounds being separated from one another as they pass through the column. The stationary phase is subject to a mechanical force generated in particular by a hydraulic pump that pumps the mobile phase usually from an upstream connection of the column to a downstream connection of the column. As a result of flow, depending on the physical properties of the stationary phase and the mobile phase, a relatively high-pressure drop is generated across the column.

The mobile phase with the separated compounds exits the column and passes through a detector, which registers and/or identifies the molecules, for example by spectrophotometric absorbance measurements. A two-dimensional plot of the detector measurements against elution time or volume, known as a chromatogram, may be made, and from the chromatogram the compounds may be identified. For each compound, the chromatogram displays a separate curve feature also designated as a "peak".

In preparative chromatography systems, a liquid as the mobile phase is provided usually at a controlled flow rate (e.g. in the range of 1 mL/min to thousands of mL/min, e.g. in analytical scale preparative LC in the range of 1-5 mL/min and preparative scale in the range of 4-200 mL/min) and at pressure in the range of tens to hundreds bar, e.g. 20-600 bar.

In high performance liquid chromatography (HPLC), a liquid as the mobile phase has to be provided usually at a very controlled flow rate (e.g. in the range of microliters to milliliters per minute) and at high-pressure (typically 20-100 MPa, 200-1000 bar, and beyond up to currently 200 MPa, 2000 bar) at which compressibility of the liquid becomes noticeable.

In preparative chromatography systems used for chromatography fluidically separating samples at a larger volume, typically in the range of 0.1 mL to tens of mL, there often is a need for analyzing a smaller volume of such sample prior to running the separation of the larger volume (e.g. in the sense of an "analytical scouting run"). For such purpose, an analytical chromatography system may be used for chromatographically separating smaller sample volumes, typically in the range of 10 µL-50 µL. Such analytical chromatography system may be an HPLC system.

The Agilent Dual Loop Sampler G2258A, by the applicant Agilent Technologies, Inc., provides a sampling unit for a combined analytical and preparative chromatography system allowing to inject sample into the analytical as well as the preparative chromatography system.

Sample injectors in chromatography systems are provided for injecting the sample fluid into the mobile phase. Such sample injectors typically comprise a needle for aspirating the sample fluid e.g. from a sample vial. For injecting the (aspirated) sample fluid into the mobile phase, the needle can be inserted into a corresponding needle seat fluidically coupled to a chromatographic column for separating compounds of the sample fluid in the mobile phase.

SUMMARY

There may be a need to provide an improved sampling, in particular for chromatographic sample separation.

According to some embodiments of the present disclosure, a sampling unit comprises a needle configured for aspirating a sample fluid, a housing, and a fitting. The needle comprises a needle tip and a needle channel through the needle for guiding the aspirated sample fluid, wherein the needle channel opens at the needle tip. The housing comprises a housing cavity and a housing channel opening into the housing cavity. The fitting comprises a fitting cavity and a fitting channel, wherein the fitting is configured for sealingly receiving the needle tip into the fitting cavity and for being (e.g., sealingly) inserted into the housing cavity, so that the fitting channel on one side fluidically couples to the needle channel and on another side (e.g., sealingly) couples to the housing channel. This allows e.g. to omit a commonly used seat capillary, avoiding unnecessary volume, and/or by placing the fitting in an appropriate position directly introducing the needle into (e.g. a port of) an injection valve.

In embodiments, the housing is or comprises a valve comprising a plurality of ports and being configured for switching one or more fluidic connections between the plurality of ports, wherein one of the plurality of ports is provided by or at least fluidically coupled to the housing cavity. This allows to couple the needle directly to a port of the valve, thus e.g. allowing to minimize the fluidic flow path.

In embodiments, the fitting is configured for providing a sealing fluidic coupling between the needle channel and the housing channel, when the needle is received into the fitting cavity, the fitting is inserted into the housing cavity, and the needle is pressed against the housing. This allows, on one hand, to remove the needle from the housing e.g. for aspirating sample fluid and, on the other hand, sealingly coupling the needle to the housing to provide a sealed and fluid tight flow path between the needle and the housing.

In embodiments, the coupling between the needle tip and the fitting cavity is provided by a cone-to-cone coupling.

In embodiments, the coupling between the fitting and the housing cavity is provided by a cone-to-cone coupling.

In embodiments, the needle comprises a tapered shape comprising an external cone extending on a lateral side of the needle tip and decreasing in diameter towards an end of the needle tip. Alternatively or in addition, the tapered shape may comprise an internal cone extending, e.g. on a lateral side of the needle tip, and increasing in diameter towards an end of the needle tip.

In embodiments, the fitting cavity comprises a tapered shape comprising an internal cone decreasing in diameter towards the one end of the fitting channel. Alternatively or in addition, the tapered shape may comprise an external cone increasing in diameter towards the end of the fitting channel.

In embodiments, the fitting comprises a tapered shape comprising an external cone extending on a lateral side of the fitting and decreasing in diameter towards the other end of the fitting channel. Alternatively or in addition, the tapered shape may comprise an internal cone extending, e.g. on a lateral side of the fitting, and increasing in diameter towards the other end of the fitting channel.

In embodiments, the housing cavity comprises a tapered shape comprising an internal cone decreasing in diameter towards the housing channel. Alternatively or in addition, the tapered shape may comprise an external cone increasing in diameter towards the housing channel.

In embodiments, the fitting is configured for providing a sealing fluidic coupling between the needle channel and the housing channel when the needle is pressed against the housing, by coupling the external cone of the needle to the internal cone of the fitting cavity, and by coupling the external cone of the fitting to the internal cone of the housing cavity.

In embodiments, the needle comprises an elongated shape, and/or a cylindrical shape.

In embodiments, the needle channel is configured for at least partly buffering the aspirated sample fluid.

In embodiments, the housing cavity comprises an internal thread interacting with an external thread of the fitting for coupling the fitting to the housing.

In embodiments, the housing channel is or comprises a conduit.

In embodiments, the fitting is configured as a needle seat for seating the needle.

In embodiments, the fitting is configured for sealingly receiving on one side the needle tip into the fitting cavity and for being sealingly inserted on another side into the housing cavity.

In embodiments, the fitting is configured for sealingly receiving the needle tip into the fitting cavity and for being sealingly inserted into the housing cavity, so that the fitting channel on one side fluidically couples to the needle channel and on another side fluidically couples to the housing channel.

In embodiments, the fitting comprises, in a region where the needle tip abuts to the fitting cavity, a material (e.g., a polymer such as PEEK, e.g. carbon filled PEEK) being softer than a material of the needle tip (e.g., stainless-steel SST).

In embodiments, the fitting comprises a first element and a second element, wherein the first element is configured to receive the needle tip, the second element is configured to be mechanically coupled to and engage with the housing cavity, and the first element is pivotally coupled with the second element to allow an axial alignment between the fitting channel and the housing channel when the needle is received in the fitting cavity and pressing against the housing.

In embodiments, the fitting comprises a channel element comprising at least a portion of the fitting channel.

The channel element may be configured for providing an axial alignment of the needle channel opening at the needle tip and the fitting channel opening into the fitting cavity. The channel element may be configured to at least substantially maintain a diameter of the fitting channel when the needle is pressed against the housing. The channel element may be configured to at least substantially maintain a value of flow restriction provided by the fitting channel when the needle is pressed against the housing. The channel element may comprise a ceramic material. The channel element may comprise a tapered shape comprising an external cone extending on a lateral side of the fitting and decreasing in diameter towards the other end of the fitting channel.

In embodiments, the sampling unit is a sample injector for a chromatography system comprising a mobile phase drive and a separation unit. The mobile phase drive is configured for driving a mobile phase through the separation unit, the separation unit is configured for chromatographically separating compounds of a sample fluid in the mobile phase, and the sample injector is configured for injecting the sample fluid into the mobile phase.

In embodiments, a separation system is provided for separating compounds of a sample fluid in a mobile phase. The fluid separation system comprises a mobile phase drive, such as a pumping system, configured to drive the mobile phase through the fluid separation system, a separation unit, such as a chromatographic column, configured for separating compounds of the sample fluid in the mobile phase; and a sampling unit and/or a sample injector according to any one of the aforementioned embodiments and being configured to introduce the sample fluid into the mobile phase.

In one embodiment, the separation system comprises one or more of: a detector configured to detect separated compounds of the sample fluid; a collection unit configured to collect separated compounds of the sample fluid; a data processing unit configured to process data received from the fluid separation system; a degassing apparatus configured to degas the mobile phase.

In one embodiment, a method of sampling is provided. The method comprises aspirating a sample fluid via a needle having a needle tip and a needle channel through the needle, penetrating at least a portion of the needle tip into a fitting cavity of a fitting received into a housing cavity of a housing, pressing the needle against the housing so that a fitting channel of the fitting on one side (e.g., sealingly) fluidically couples to the needle channel and on another side (e.g., sealingly) fluidically couples to a housing channel of the housing opening into the housing cavity, and injecting at least a portion of the aspirated sample fluid via the fitting channel into the housing channel.

In one embodiment, the method further comprises injecting at least a portion of the sample fluid contained in the housing channel into a mobile phase, and chromatographically separating the sample fluid in the mobile phase.

In one embodiment, the needle comprises an elongated shape, and/or a cylindrical shape.

In one embodiment, the needle channel is configured for at least partly buffering the aspirated sample fluid.

In one embodiment, the needle is provided by one or more materials selected from the group of metal, glass, ceramic, plastic, and polymer, and the needle tip may be provided by a different material than other parts of the needle. The needle may be embodied as a replaceable component which may be inserted into and mechanically secured and fixed by the handling unit.

Embodiments of the present invention might be embodied based on most conventionally available HPLC systems, such as the Agilent 1220, 1260 and 1290 Infinity LC Series (provided by the applicant Agilent Technologies).

One embodiment of an HPLC system comprises a pumping apparatus having a piston for reciprocation in a pump working chamber to compress liquid in the pump working chamber to a high pressure at which compressibility of the liquid becomes noticeable.

The separating device may be or include a chromatographic column providing the stationary phase. The column might be a glass, metal, ceramic or a composite material tube (e.g. with a diameter from 50 µm to 5 mm and a length of 1 cm to 1 m) or a microfluidic column (as disclosed e.g. in EP 1577012 A1 or the Agilent 1200 Series HPLC-Chip/MS System provided by the applicant Agilent Technologies). The individual components are retained by the stationary phase differently and separate from each other while they are propagating at different speeds through the column with the eluent. At the end of the column they elute at least partly separated from each other. During the entire chromatography process the eluent might be also collected in a series of fractions. The stationary phase or adsorbent in column chromatography usually is a solid material. The most common stationary phase for column chromatography is silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface, which can be especially chemically modified, though in EBA a fluidized bed is used.

The mobile phase (or eluent) can be either a pure solvent or a mixture of different solvents. It can also contain additives, i.e. be a solution of the said additives in a solvent or a mixture of solvents. It can be chosen e.g. to adjust the retention of the compounds of interest and/or the amount of mobile phase to run the chromatography. The mobile phase can also be chosen so that the different compounds can be separated effectively. The mobile phase might comprise an organic solvent like e.g. methanol or acetonitrile, often diluted with water. For gradient operation water and organic solvent are delivered in separate containers, from which the gradient pump delivers a programmed blend to the system. Other commonly used solvents may be isopropanol, THF, hexane, ethanol and/or any combination thereof or any combination of these with aforementioned solvents.

The sample fluid might comprise any type of process liquid, natural sample like juice, body fluids like plasma or it may be the result of a reaction like from a fermentation broth.

The fluid may be a liquid but may also be or comprise a gas and/or a supercritical fluid (as e.g. used in supercritical fluid chromatography—SFC—as disclosed e.g. in U.S. Pat. No. 4,982,597 A).

The pressure in the mobile phase might range from 2-200 MPa (20 to 2000 bar), in particular 10-150 MPa (100 to 1500 bar), and more particular 50-130 MPa (500 to 1300 bar).

The HPLC system might further comprise a detector for detecting separated compounds of the sample fluid, a fractionating unit for outputting separated compounds of the sample fluid, or any combination thereof. Further details of HPLC system are disclosed with respect to the aforementioned Agilent HPLC series, provided by the applicant Agilent Technologies.

Embodiments of the invention can be partly or entirely embodied or supported by one or more suitable software programs or products (or software), which may be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) may be applied in or by the control unit, e.g. a data processing system such as a computer, such as for executing any of the methods described herein. For example, one embodiment of the present disclosure provides a non-transitory computer-readable medium that includes instructions stored thereon, such that when executed on a processor, the instructions perform the steps of the method of any of the embodiments disclosed herein.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance biomolecules such as proteins. Since separation of a fluidic sample into fractions involves a certain separation criterion (such as mass, volume, chemical properties, etc.) according to which a separation is carried out, each separated fraction may be further separated by another separation criterion (such as mass, volume, chemical properties, etc.) or finer separated by the first separation criterion, thereby splitting up or separating a separate fraction into a plurality of sub-fractions.

In the context of this application, the term "sample separation apparatus", "fluid separation apparatus" or similar may particularly denote any apparatus which is capable of separating different fractions of a fluidic sample by applying a certain separation technique. Particularly, two separation apparatus may be provided in such a sample separation apparatus when being configured for a two-dimensional separation. This means that the sample is first separated in accordance with a first separation criterion, and at least one or some of the fractions resulting from the first separation are subsequently separated in accordance with a second, different, separation criterion or more finely separated in accordance with the first separation criterion.

The term "separation unit", "separation device" or similar may particularly denote a fluidic member through which a fluidic sample is transferred, and which is configured so that, upon conducting the fluidic sample through the separation unit, the fluidic sample will be separated into different groups of molecules or particles (called fractions or sub-fractions, respectively). An example for a separation unit is a liquid chromatography column which is capable of trapping or retaining and selectively releasing different fractions of the fluidic sample.

In the context of this application, the term "fluid drive", "mobile phase drive" or similar may particularly denote any kind of pump which is configured for forcing a flow of mobile phase and/or a fluidic sample along a fluidic path.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that FIG. 1 illustrates a liquid chromatography system according to an exemplary embodiment.

DETAILED DESCRIPTION

Figure 1:
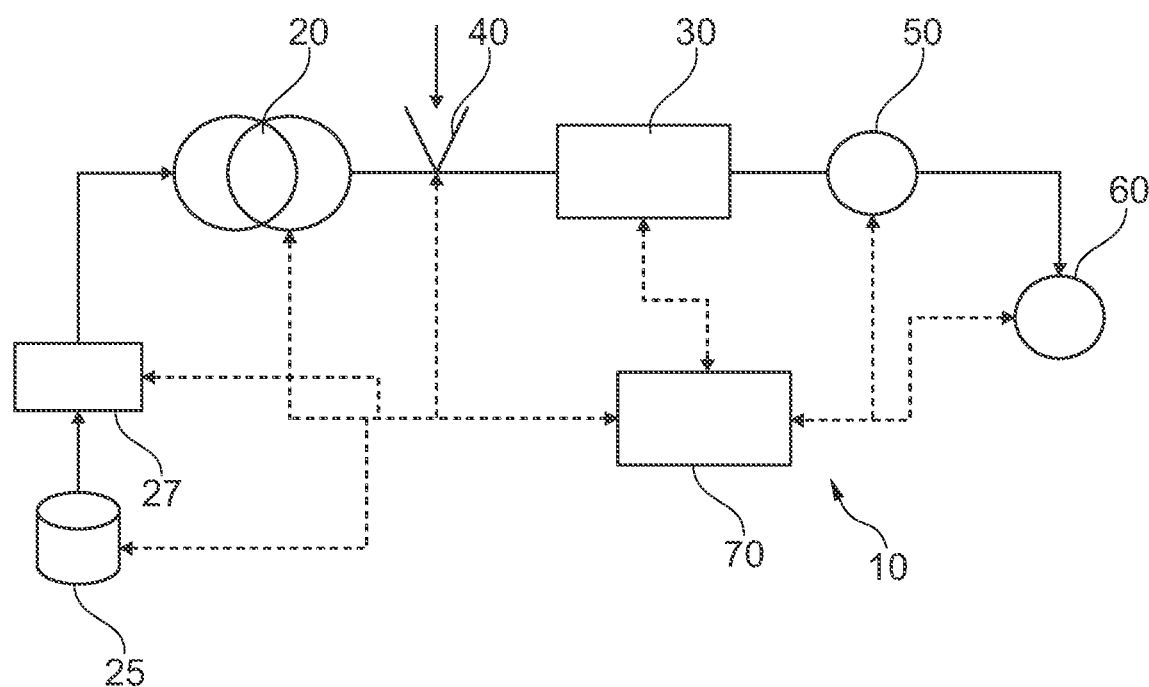

Referring now in greater detail to the drawings, FIG. 1 depicts a general schematic of a liquid separation system 10. A mobile phase drive 20 (such as a pump) receives a mobile phase from a solvent supply 25, typically via a degasser 27, which degases the mobile phase and thus reduces the amount of dissolved gases in it. The mobile phase drive 20 drives the mobile phase through a separating device 30 (such as a chromatographic column). A sample injector 40 (also referred to as sample introduction apparatus, sample dispatcher, etc.) is provided between the mobile phase drive 20 and the separating device 30 in order to subject or add (often referred to as sample introduction) portions of one or more sample fluids into the flow of a mobile phase. The separating device 30 is configured for separating compounds of the sample fluid, e.g. a liquid. A detector 50 is provided for detecting separated compounds of the sample fluid. A fractionating unit 60 can be provided for outputting separated compounds of sample fluid. In one embodiment, at least parts of the sample injector 40 and the fractionating unit 60 (or collection unit) can be combined, e.g. in the sense that some common hardware is used as applied by both of the sample injector 40 and the fractionating unit 60.

The separating device 30 may comprise a stationary phase configured for separating compounds of the sample fluid. Alternatively, the separating device 30 may be based on a different separation principle (e.g. field flow fractionation).

While the mobile phase can be comprised of one solvent only, it may also be mixed of plurality of solvents. Such mixing might be a low pressure mixing and provided upstream of the mobile phase drive 20, so that the mobile phase drive 20 already receives and pumps the mixed solvents as the mobile phase. Alternatively, the mobile phase drive 20 might be comprised of plural individual pumping units, with plural of the pumping units each receiving and pumping a different solvent or mixture, so that the mixing of the mobile phase (as received by the separating device 30) occurs at high pressure and downstream of the mobile phase drive 20 (or as part thereof). The composition (mixture) of the mobile phase may be kept constant over time, the so-called isocratic mode, or varied over time, the so-called gradient mode.

A data processing unit 70, which can be a conventional PC or workstation, might be coupled (as indicated by the dotted arrows) to one or more of the devices in the liquid separation system 10 in order to receive information and/or control operation. For example, the data processing unit 70 might control operation of the mobile phase drive 20 (e.g. setting control parameters) and receive therefrom information regarding the actual working conditions (such as output pressure, flow rate, etc. at an outlet of the pump). The data processing unit 70 might also control operation of the solvent supply 25 (e.g. monitoring the level or amount of the solvent available) and/or the degasser 27 (e.g. setting control parameters such as vacuum level) and might receive therefrom information regarding the actual working conditions (such as solvent composition supplied over time, flow rate, vacuum level, etc.). The data processing unit 70 might further control operation of the sample injector 40 (e.g. controlling sample introduction or synchronization of the sample introduction with operating conditions of the mobile phase drive 20). The separating device 30 might also be controlled by the data processing unit 70 (e.g. selecting a specific flow path or column, setting operation temperature, etc.), and send—in return—information (e.g. operating conditions) to the data processing unit 70. Accordingly, the detector 50 might be controlled by the data processing unit 70 (e.g. with respect to spectral or wavelength settings, setting time constants, start/stop data acquisition), and send information (e.g. about the detected sample compounds) to the data processing unit 70. The data processing unit 70 might also control operation of the fractionating unit 60 (e.g. in conjunction with data received from the detector 50) and provides data back. The data processing unit 70 might also process the data received from the system or its part and evaluate it in order to represent it in adequate form prepared for further interpretation.

Figure 2:
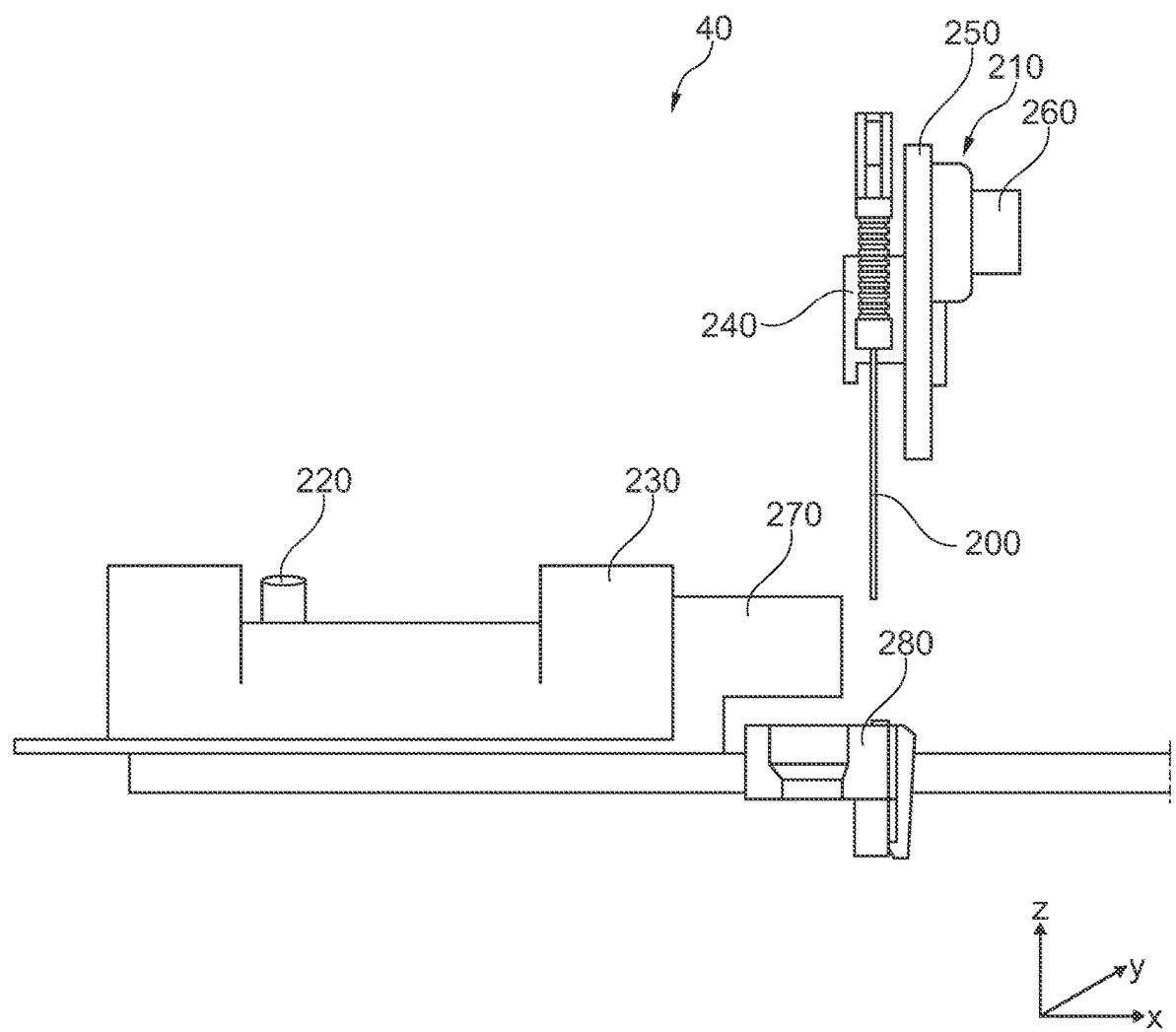
FIG. 2 illustrates a sample injector according to an exemplary embodiment.

FIG. 2 illustrates in greater detail an embodiment of the sample injector 40. The sample injector 40 comprises a needle 200 and a handling unit 210 configured for moving and positioning the needle 200. One or more receptacles 220, which may comprise e.g. a sample fluid to be injected by the sample injector 40, can be provided e.g. in a tray 230, such as a vial plate or any other container as known in the art. In the example of FIG. 2, only one receptacle 220 shall be represented for the sake of simplicity.

The positioning of the needle 200 as provided by the handling unit 210 may be only in Z-direction, as indicated the axis diagram, allowing to position the needle 200 in (only) height e.g. by lowering or lifting the needle 200 in Z-direction. For such purpose, the handling unit 210 may comprise a slider 240 configured to slide in Z-direction along a guide 250, e.g. operated by a drive unit 260 which may be an electrical motor.

The handling unit 210 may further be configured to move and position the needle 200 into the X-direction and/or into the Y-direction (as indicated in the axis diagram), as readily known in the art.

The tray 230 as shown in the embodiment of FIG. 2 is positioned on a movable sleigh 270, which may be moved into the X-direction and/or into the Y-direction (as indicated in the axis diagram), as readily known in the art, in order to position the one or more receptacles 220 with respect to the needle 200.

In the exemplary embodiment of FIG. 2, the sleigh 270 is configured to be movable in X-direction, while the handling unit 210 is configured to move the needle 200 as well in Z-direction as in Y-direction. However, it is clear that other mechanisms of (relative) movement may be applied accordingly, including rotational movements and combinations thereof.

A needle seat 280 is provided into which the needle 200 can be seated (e.g. by operation of the handling unit 210) allowing to fluidically couple the needle 200 with the high-pressure flow path between the pump 20 and the separating device 30 of the liquid separation system 10, e.g. in order to inject a sample fluid (for example aspirated into the needle 200 e.g. from the container 220) into such high pressure flow path for chromatographic separation by the separating device 30. Such injection may be by feed injection, as described e.g. in the aforementioned US2017343520A1, and/or by flow through injection, as described e.g. in the aforementioned US20160334031A1.

Figure 3:
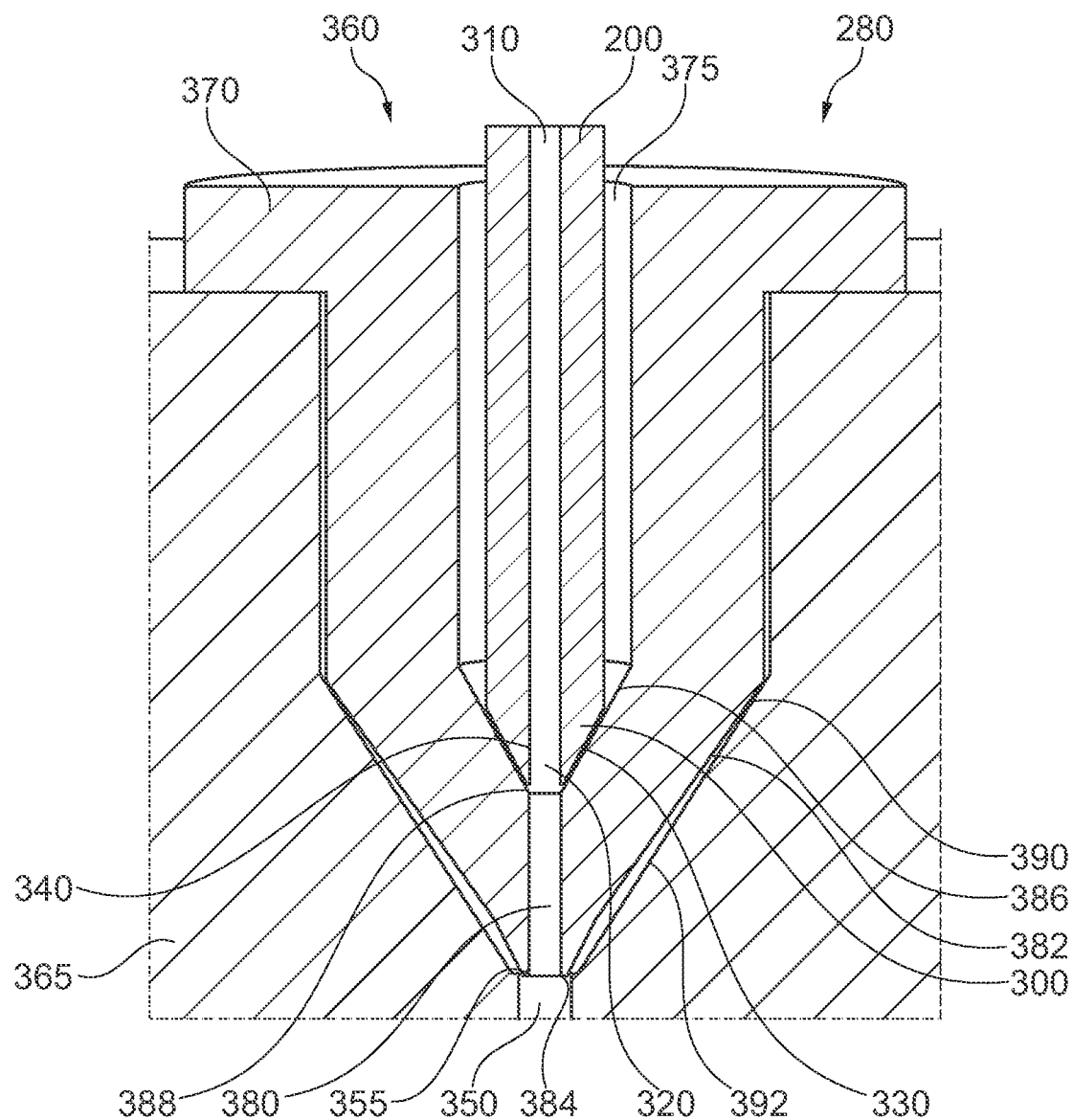
FIG. 3 illustrates a needle being seated into a needle seat according to an exemplary embodiment.

FIG. 3 shows in greater detail and in a two-dimensional cut-through representation an embodiment of the needle 200 being seated into the needle seat 280. The needle 200 has an elongated e.g. cylindrical shape with a needle tip 300. In contrast to FIG. 2, where the needle 200 is physically separated from the needle seat 280, the needle 200 in FIG. 3 is represented as being seated into the needle seat 280, so that a portion of the needle 200 e.g. at least the needle tip 300, is penetrating into the needle seat 280 and fluidically coupling thereto.

A needle channel 310 is extending through the needle 200 for guiding (or also buffering at least a portion of) the sample fluid aspirated by the needle 200. The needle channel 310 is opening into a needle opening 320 at the needle tip 300. In the embodiment of FIG. 3, the needle tip 300 has a conical outer shape 330 (or tapered shape, or external cone) with an outer diameter of the needle 200 decreasing towards an end 340 of the needle tip 300 where the needle opening 320 is provided. It is clear that the conical outer shape 330 can have any appropriate form and does not necessarily need to be a linear cone as shown in the exemplary embodiment of FIG. 3.

The needle seat 280 comprises a channel 350 configured for fluidically coupling with the needle channel 310 of the needle 200. The channel 350 may be any kind of conduit, e.g. provided by a bore or a capillary gripped within the needle seat 280, and may have an elongated e.g. cylindrical shape. In the embodiment of FIG. 3, the channel 350 has a channel opening 355 opening into a housing cavity 360 into a housing 365 of the needle seat 280.

A fitting 370 is provided for sealingly receiving the needle 200 and for providing a fluidic coupling between the needle channel 310 and the channel 350 in the housing 365 of the needle seat 280. The fitting 370 has a fitting cavity 375 into which the needle 200 can be inserted and received by the fitting 370. The fitting 370 is configured to be inserted into the housing cavity 360. A fitting channel 380 is provided within the fitting 370.

In the embodiment of FIG. 3, the fitting 370 has a conical outer shape 382 (or tapered shape, or external cone) with an outer diameter of the fitting 370 decreasing towards an end 384 of the fitting 370. The fitting channel 380 has an opening at the end 384. It is clear that the conical outer shape 382 can have any appropriate form and does not necessarily need to be a linear cone as shown in the exemplary embodiment of FIG. 3.

In the embodiment of FIG. 3, the fitting cavity 375 has a conical inner shape 386 (or tapered shape, or internal cone) with an inner diameter of the fitting cavity 375 decreasing towards an end 388 of the fitting cavity 375. The fitting channel 380 has an opening at the end 388. It is clear that the conical inner shape 386 can have any appropriate form and does not necessarily need to be a linear cone as shown in the exemplary embodiment of FIG. 3.

Further in the embodiment of FIG. 3, the housing cavity 360 has a conical inner shape 390 with an inner diameter of the housing cavity 360 decreasing towards an end 392 of the housing cavity 360. The channel 350 has an opening at the end 392. It is clear that the conical inner shape 390 can have any appropriate form and does not necessarily need to be a linear cone as shown in the exemplary embodiment of FIG. 3.

When the needle 200 is received into the fitting 370, and the fitting 370 is received into the needle seat 280, as depicted schematically in FIG. 3, the fitting channel 380 extends between the ends 384 and 388, thus providing a fluidic coupling between the needle channel 310 and the channel 350. This allows to transfer fluid from the needle 200 via the needle channel 310 and into the channel 350 of the needle seat 280. With the needle seat 280 being part of the sample injector 40, this allows to inject fluid, e.g. sample fluid aspirated by the needle 200 (e.g. from receptacle 220), into the mobile phase in the high-pressure flow path between the mobile phase drive 20 and the separating device 30.

In operation, when the needle 200 is received into the fitting 370, and the fitting 370 is received into the needle seat 280, as depicted schematically in FIG. 3, the needle 200 provides an axial force F against the fitting 370 and thus against the needle seat 280. The axial force F firstly presses the conical outer shape 330 (of the needle 300) against the corresponding conical inner shape 386 (of the fitting 370), thus providing a fluidic sealing between the needle 200 and the fitting 370. Secondly, the axial force F presses the conical outer shape 382 (of the fitting 370) against the corresponding conical inner shape 390 (of the housing 365), thus providing a fluidic sealing between the fitting 370 and the housing 365. Accordingly, the axial force F results in a sealingly fluidic coupling from the needle channel 310 to the channel 350 (of the needle seat 280) through the fitting channel 380. Alternatively or in addition to the axial force F, the conical outer shape 382 (of the fitting 370) may also be (already) pressed against the corresponding conical inner shape 390 (of the housing 365) as resulting from adequately attaching the fitting 370 into the housing cavity 360 of the housing 365 (e.g. by screwing as shown in the embodiment of FIG. 4), thus also or additionally providing a fluidic sealing between the fitting 370 and the housing 365.

It is clear and well known in the art that sealing between counteracting conical shapes can be achieved by adequately designing the conical angles of the corresponding and counteracting conical shapes, in particular between the conical outer shape 330 (of the needle 300) against the corresponding conical inner shape 386 (of the fitting 370) as well as between the conical outer shape 382 (of the fitting 370) against the corresponding conical inner shape 390 (of the housing 365), e.g. by providing substantially the same or slightly differing angles.

The housing 365 of the needle seat 280 may be a part of or provided by a switching valve, such as an injection valve (not shown in the figures) of the sample injector 40. Such injection valve can be used for providing the fluidic coupling in order to allow aspirating of sample fluid on one hand and, on the other hand injecting such aspirated sample fluid into the high-pressure flow path between the mobile phase drive 20 and the separating device 30. Injection valves are well known in the art and described e.g. in WO2020084334A1 by the same applicant. The switching/injection valve may comprise a plurality of ports and be configured for switching one or more fluidic connections between the plurality of ports. One of the plurality of ports may be provided by or at least fluidically coupled to the housing cavity 360.

Figure 4:
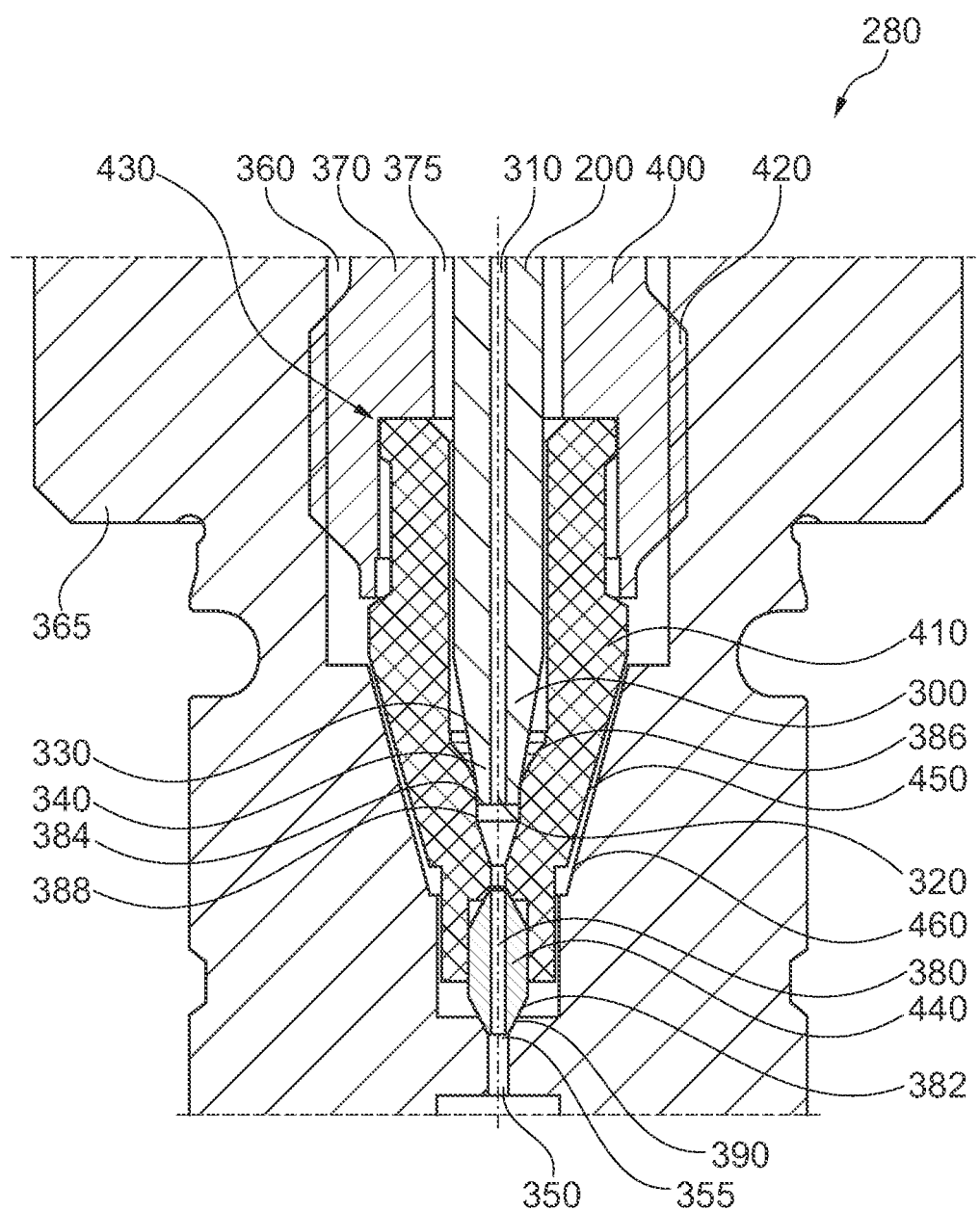
FIG. 4 illustrates a needle being seated into a needle seat according to another exemplary embodiment.

FIG. 4 illustrates in a cut-through representation another embodiment of the needle 200 being seated into the needle seat 280 being substantially similar to the embodiment of FIG. 3. Corresponding features having substantially the same functionality are indicated by the same reference numerals.

The main differences in the embodiment of FIGS. 3 and 4 lie in the design of the fitting 370. While the fitting 370 in the embodiment of FIG. 3 is provided by one piece only, the fitting 370 in the embodiment of FIG. 4 is provided in a two-piece structure with two individual elements, namely an upper fitting piece 400 (or second element) and a lower fitting piece 410 (or first element). The upper fitting piece 400 is provided with an external screw thread 420 allowing to mate with an internal screw thread (not directly indicated in FIG. 4) of the housing 365 within the housing cavity 360, so that the fitting 370 can be fixedly attached into the housing cavity 360 of the housing 365.

The lower fitting piece 410 is hingingly coupled with the upper fitting piece 400 by a joint coupling 430, e.g. allowing to reduce lateral forces onto the lower fitting piece 410 which may adversely affect fluidic sealing between the needle 200 and the fitting 370 as well as between the fitting 370 and the housing 365. The joint coupling 430 is configured so that corresponding (inner and outer) conical shapes "can find each other" and sealingly attach and engage with each other. This may apply in particular between the conical outer shape 382 (of the fitting 370) and the corresponding conical inner shape 390 (of the housing 365).

The fitting 370 in the embodiment of FIG. 4 further comprises a coupling piece 440 (or channel element) for providing the fluidic sealing to the housing 365. The coupling piece 440 may be provided by a material being substantially harder than a material of the housing 365, at least in the area of the conical inner shape 390, in order to avoid or at least reduce a radial decrease of a diameter of the fitting channel 380 (within the coupling piece 440) when pressing the fitting 370 against the housing 365. Such radial decrease may in particular result from material (in particular of the coupling piece 440) flowing into the fitting channel 380 e.g. under the influence of the axial pressing force F. In other words, rather the housing 365 of the needle seat 280 than the fitting 370 should be deformed (as resulting from the axial force F) to avoid undesired restrictions in the flow path (resulting from such channel deformation). The coupling piece 440 may be provided by a ceramic material, hardened steel, MP35N alloy (a nickel-cobalt based alloy), et cetera, and/or the material of the housing 365 (at least in the area of the conical inner shape 390) may be provided by a plastic material, such as natural or filled PEEK, et cetera.

The lower fitting piece 410 (at least in the area of the conical inner shape 386 where the needle tip 300 abuts to) is referably may be provided by a material softer than a material of the needle 200 and specifically of the needle tip 300, in order to avoid or at least reduce a radial decrease of a diameter of the needle channel 310 (in the area of the needle tip 300) as a result or under the influence of the axial pressing force F. In other words, rather the lower fitting piece 410 than the needle 200 should be deformed (as resulting from the axial force F) to avoid undesired restrictions in the flow path (resulting from such channel deformation). Examples of materials of the lower fitting piece 410 (at least in the area of the conical inner shape 386) include, but are not limited to, carbon filled PEEK, other chemically and mechanically resistant plastics, or the like. Examples of materials of the needle 200 (at least in the area of the needle tip 300) include, but are not limited to, ceramic, hardened steel, MP35N, or the like. Examples of materials of the upper fitting piece 400 include, but are not limited to, stainless steel (SST) or comparable materials.

In the embodiment of FIG. 4, the fitting 370 has a further conical outer shape 450 matching to a further conical inner shape 460 (within the housing cavity 360). In operation, the conical inner shape 460 provides a guiding to the conical outer shape 450 in order to position and align the lower fitting piece 410 with respect to the housing 365 and in particular with respect to the channel 350. However, a fluidic sealing does not necessarily have to be provided between the conical outer shape 450 and the conical inner shape 460.

The invention claimed is:

1. A sampling unit, comprising:
a needle configured for aspirating a sample fluid, wherein the needle comprises a needle tip and a needle channel through the needle for guiding the aspirated sample fluid, and wherein the needle channel opens at the needle tip;
a housing comprising a housing cavity and a housing channel opening into the housing cavity; and
a fitting having a fitting cavity and a fitting channel, wherein:
the fitting comprises an external tapered shape extending on a lateral side of the fitting and decreasing in diameter towards an end of the fitting channel;
the housing cavity comprises an internal tapered shape decreasing in diameter towards the housing channel;
the fitting is configured to sealingly receive the needle tip into the fitting cavity and to be inserted into the housing cavity, so that the fitting channel on one side fluidically couples to the needle channel and on another side couples to the housing channel; and
the needle, the housing, and the fitting are configured such that, when the needle tip is received into the fitting cavity and the fitting is inserted into the housing cavity, the needle provides an axial force that presses the external tapered shape of the fitting against the internal tapered shape of the housing cavity to provide a sealing between the fitting and the housing.

2. The sampling unit of claim 1, wherein:
the housing comprises a valve comprising a plurality of ports and being configured for switching one or more fluidic connections between the plurality of ports; and
one of the plurality of ports is provided by or at least fluidically coupled to the housing cavity.

3. The sampling unit of claim 1, wherein the fitting is configured to provide a sealing fluidic coupling between the needle channel and the housing channel, when the needle tip is received into the fitting cavity, the fitting is inserted into the housing cavity, and the needle is pressed against the housing.

4. The sampling unit of claim 3, comprising at least one of:
a coupling between the needle tip and the fitting cavity is provided by a cone-to-cone coupling;
a coupling between the fitting and the housing cavity is provided by a cone-to-cone coupling.

5. The sampling unit of claim 1, comprising at least one of:
the needle comprises a tapered shape comprising an external cone extending on a lateral side of the needle tip and decreasing in diameter towards an end of the needle tip;
the fitting cavity comprises a tapered shape comprising an internal cone decreasing in diameter towards the one end of the fitting channel;
the external tapered shape of the fitting comprises an external cone;
the internal tapered shape of the housing cavity comprises an internal cone.

6. The sampling unit of claim 5, wherein the fitting is configured to provide a sealing fluidic coupling between the needle channel and the housing channel when the needle is pressed against the housing, by coupling the external cone of the needle to the internal cone of the fitting cavity, and by coupling the external cone of the fitting to the internal cone of the housing cavity.

7. The sampling unit of claim 1, comprising at least one of:
the needle comprises an elongated shape;
the needle comprises a cylindrical shape;
the needle channel is configured for at least partly buffering the aspirated sample fluid;
the housing channel comprises a conduit;
the fitting is configured as a needle seat for seating the needle.

8. The sampling unit of claim 1, wherein the fitting comprises a channel element comprising at least a portion of the fitting channel, and further comprising at least one of:
the channel element is configured for providing an axial alignment of the needle channel opening at the needle tip and the fitting channel opening into the fitting cavity;
the channel element is configured to at least substantially maintain a diameter of the fitting channel when the needle is pressed against the housing;
the channel element is configured to at least substantially maintain a value of flow restriction provided by the fitting channel when the needle is pressed against the housing;
the channel element comprises one or more materials selected from the group consisting of: a ceramic material; hardened steel; and a nickel-cobalt based alloy;
the channel element comprises a tapered shape comprising an external cone extending on a lateral side of the fitting and decreasing in diameter towards the other end of the fitting channel.

9. The sampling unit of claim 1, wherein the sampling unit is a sample injector for a chromatography system comprising a mobile phase drive and a separation unit, the mobile phase drive is configured for driving a mobile phase through the separation unit, the separation unit is configured for chromatographically separating compounds of a sample fluid in the mobile phase, and the sample injector is configured for injecting the sample fluid into the mobile phase.

10. A fluid separation system for separating compounds of a sample fluid in a mobile phase, the fluid separation system comprising:
a mobile phase drive configured to drive the mobile phase through the fluid separation system;
a separation unit configured to separate compounds of the sample fluid in the mobile phase; and
the sampling unit of claim 1, configured to introduce the sample fluid into the mobile phase.

11. The fluid separation system of claim 10, further comprising at least one of:
a detector configured to detect separated compounds of the sample fluid;
a collection unit configured to collect separated compounds of the sample fluid;
a data processing unit configured to process data received from the fluid separation system;
a degassing apparatus configured to degas the mobile phase.

12. A method for sampling, the method comprising:
providing the sampling unit of claim 1;
aspirating the sample fluid via the needle;
inserting the fitting into the housing cavity;
penetrating at least a portion of the needle tip into the fitting cavity;
pressing the needle against the housing so that the fitting channel on one side fluidically couples to the needle channel and on another side fluidically couples to the housing channel; and
injecting at least a portion of the aspirated sample fluid via the fitting channel into the housing channel.

13. The method of claim 12, further comprising:
injecting at least a portion of the sample fluid contained in the housing channel into a mobile phase; and
chromatographically separating the sample fluid in the mobile phase.

14. A non-transitory computer-readable medium with instructions stored thereon, that when executed by a processor, control the steps of aspirating, inserting, penetrating, pressing, and injecting according to the method of claim 12.

15. The sampling unit of claim 1, wherein the housing cavity comprises an internal thread interacting with an external thread of the fitting for coupling the fitting to the housing.

16. The sampling unit of claim 1, wherein the fitting comprises, in a region where the needle tip abuts to the fitting cavity, a material being softer than a material of the needle tip.

17. The sampling unit of claim 1, wherein the fitting comprises a first element and a second element, wherein the first element is configured to receive the needle tip, the second element is configured to mechanically couple to and engage with the housing cavity, and the first element is pivotally coupled with the second element to allow an axial alignment between the fitting channel and the housing channel when the needle is received in the fitting cavity and pressing against the housing.

18. A sampling unit, comprising:
a needle configured for aspirating a sample fluid, wherein the needle comprises a needle tip and a needle channel through the needle for guiding the aspirated sample fluid, and wherein the needle channel opens at the needle tip;
a housing comprising a housing cavity and a housing channel opening into the housing cavity; and
a fitting having a fitting cavity and a fitting channel, wherein:
the needle comprises a tapered shape comprising an external cone extending on a lateral side of the needle tip and decreasing in diameter towards an end of the needle tip;
the fitting cavity comprises a tapered shape comprising an internal cone decreasing in diameter towards the one end of the fitting channel;
the fitting comprises a tapered shape comprising an external cone extending on a lateral side of the fitting and decreasing in diameter towards the other end of the fitting channel;
the housing cavity comprises a tapered shape comprising an internal cone decreasing in diameter towards the housing channel;
the fitting is configured to sealingly receive the needle tip into the fitting cavity and to be inserted into the housing cavity, so that the fitting channel on one side fluidically couples to the needle channel and on another side couples to the housing channel; and
the fitting is configured to provide a sealing fluidic coupling between the needle channel and the housing channel when the needle is pressed against the housing, by coupling the external cone of the needle to the internal cone of the fitting cavity, and by coupling the external cone of the fitting to the internal cone of the housing cavity.

\* \* \* \* \*